United States Patent
Hosseini et al.

(10) Patent No.: US 11,700,066 B2
(45) Date of Patent: Jul. 11, 2023

(54) METHOD AND SYSTEM FOR SHARING QUANTUM ENTANGLEMENT BETWEEN DISTANT NODES WITHOUT QUANTUM MEMORIES

(71) Applicant: Purdue Research Foundation, West Lafayette, IN (US)

(72) Inventors: Mahdi Hosseini, West Lafayette, IN (US); Andrew M Weiner, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/835,013

(22) Filed: Jun. 8, 2022

(65) Prior Publication Data

US 2022/0416907 A1 Dec. 29, 2022

Related U.S. Application Data

(60) Provisional application No. 63/216,452, filed on Jun. 29, 2021.

(51) Int. Cl.
*H04B 10/00* (2013.01)
*H04B 10/70* (2013.01)
*H04J 14/00* (2006.01)

(52) U.S. Cl.
CPC .................... *H04B 10/70* (2013.01)

(58) Field of Classification Search
CPC ..................................................... H04B 10/70
See application file for complete search history.

(56) References Cited

U.S. PATENT DOCUMENTS

| | | | |
|---|---|---|---|
| 6,111,673 A | 8/2000 | Chang et al. | |
| 11,451,308 B1* | 9/2022 | Bucklew | H04B 10/70 |
| 2005/0094818 A1* | 5/2005 | Inoue | H04L 9/0858 |
| | | | 380/278 |

(Continued)

OTHER PUBLICATIONS

Azuma et al., Aggregating quantum repeaters for the quantum internet. Physical Review A 2017, 96 (3), 032332.

(Continued)

*Primary Examiner* — Daniel G Dobson
(74) *Attorney, Agent, or Firm* — Piroozi-IP, LLC

(57) ABSTRACT

A photon entanglement system is disclosed which includes a plurality of remote nodes (Nodes $A_i$ and Node $B_i$) each without a quantum memory; and a central entangling node (Node C) in both quantum and classical communication with the remote Nodes configured to provide photon entanglement therebetween, and includes a first and second broadband photon generators each adapted to generate sets of photon pairs at: i) random times within time-bins, and ii) random frequency bins, wherein one photon of each pair set is transmitted to an associated remote node over quantum channels, and a multiplexed Bell-state analyzer configured to receive another photon of the pair, wherein if the received photons arrive at about same time, then the received photons are marked as being entangled by the controller which communicates the associated time-bin to the associated remote nodes and thereby entangling their associated photons.

24 Claims, 4 Drawing Sheets

(56) References Cited

U.S. PATENT DOCUMENTS

2021/0105135 A1* 4/2021 Figueroa .............. H04L 9/0858

OTHER PUBLICATIONS

Gyongyosi et al., Entanglement—Gradient Routing for Quantum Networks. Sci Rep—Uk 2017, 7 (1), 14255.
Schoute et al., Shortcuts to quantum network routing. arXiv preprint arXiv:1610.05238 2016.
Kleywegt et al., The dynamic and stochastic knapsack problem. Oper Res 1998, 46 (1), 17-35.
Gupta et al., The capacity of wireless networks. Ieee T Inform Theory 2000, 46 (2), 388-404.
Bennett et al., Teleporting an unknown quantum state via dual classical and Einstein-Podolsky-Rosen channels. Phys Rev Lett 1993, 70 (13), 1895-1899.
Ramaswami et al., Optical Networks: A Practical Perspective, 3rd Edition. 2010; p. 1-893.
McGuire et al., Standards: the blueprints for optical networking. Ieee Commun Mag 1998, 36 (2), 68-70.
Yoo, Optical-label switching, MPLS, MPLambdaS, and GMPLS. SPIE: 2001; vol. 4585.
Bosshart et al., Programming Protocol—Independent Packet Processors. Acm Sigcomm Comp Com 2014, 44 (3), 87-95.
Jones et al., Design and analysis of communication protocols for quantum repeater networks. New Journal of Physics 2016, 18 (8), 083015.
Kowligy et al., Quantum optical arbitrary waveform manipulation and measurement in real time. Opt Express 2014, 22 (23), 27942-27957.
Ndousse-Fetter et al., Quantum Networks For Open Science. arXiv preprint arXiv:1910.11658 2019.
Azuma et al., All-photonic quantum repeaters, Nature Communications vol. 6, Article No. 6787 (2015).
Fukui et al., All-optical long-distance quantum communication with Gottesman-Kitaev-Preskill qubits, Phys. Rev. Research 3, 033118—Published Aug. 5, 2021.
Pant et al., Rate-distance tradeoff and resource costs for all-optical quantum repeaters, Phys. Rev. A 95, 012304—Published Jan. 4, 2017.
Lingaraju et al., Adaptive bandwidth management for entanglement distribution in quantum networks, Optica, vol. 8, No. 3 / Mar. 2021.
Herbauts et al., Demonstration of active routing of entanglement in a multi-user network. Opt Express 2013, 21 (23), 29013-24.
Ciurana et al., Entanglement Distribution in Optical Networks. IEEE Journal of Selected Topics in Quantum Electronics 2015, 21 (3), 37-48.
Wengerowsky et al., An entanglement-based wavelength-multiplexed quantum communication network. Nature 2018, 564 (7735), 225-228.
Zhu et al., Toward a reconfigurable quantum network enabled by a broadband entangled source. Journal of the Optical Society of America B 2019, 36 (3).
Joshi et al., A trusted node-free eight-user metropolitan quantum communication network. Sci Adv 2020, 6 (36).
Navin et al., Adaptive bandwidth management for entanglement distribution in a fully-connected fiber-optic network. CLEO OSA 2020, FTh1D.2.
Semenenko et al., Entanglement generation in a quantum network with finite quantum memory lifetime, AVS Quantum Sci. 4, 012002 (2022).
Kim et al., Phase-stable source of polarization-entangled photons using a polarization Sagnac interferometer. Physical Review A 2006, 73 (1).
Kues et al., On-chip generation of high-dimensional entangled quantum states and their coherent control. Nature 2017, 546 (7660).
Imany et al., 50-GHz-spaced comb of high-dimensional frequency-bin entangled photons from an on-chip silicon nitride microresonator. Opt. Express 2018, 26 (2), 1825-1840.
Kues et al., Quantum optical microcombs. Nature Photonics 2019, 13 (3), 170-179.
Imany et al., High-dimensional optical quantum logic in large operational spaces. npj Quantum Information 2019, 5 (1).
Radnaev et al., A quantum memory with telecom-wavelength conversion. Nat. Phys. 2010, 6 (11), 894-899.
Dudin et al., Entanglement of Light-Shift Compensated Atomic Spin Waves with Telecom Light. Physical Review Letters 2010, 105 (26).
Hosseini et al., Unconditional room-temperature quantum memory. Nat Phys 2011, 7 (10), 794-798.
Rancic et al., Coherence time of over a second in a telecom-compatible quantum memory storage material. Nature Physics 2018, 14 (1), 50-54.
Asenjo-Garcia et al., Exponential Improvement in Photon Storage Fidelities Using Subradiance and "Selective Radiance" in Atomic Arrays. Phys. Rev. X 2017, p. 031024.
Volz et al., Observation of entanglement of a single photon with a trapped atom. Physical Review Letters 2006, 96 (3).
Simon et al., Quantum repeaters with photon pair sources and multimode memories. Physical Review Letters 2007, 98 (19), 190503.
Chaneliere et al., Storage and retrieval of single photons transmitted between remote quantum memories. Nature 2005, 438, 834.
Wang et al., Efficient quantum memory for single-photon polarization qubits. Nature Photonics 2019, 13 (5), 346-351.
Sangouard et al., Quantum repeaters based on atomic ensembles and linear optics. Reviews of Modern Physics 2011, 83 (1), 33-80.
Ornelas-Huerta et al., On-demand indistinguishable single photons from an efficient and pure source based on a Rydberg ensemble. Optica 2020, 7 (7), 813-819.
Moehring et al., Entanglement of single-atom quantum bits at a distance. Nature 2007, 449 (7158), 68-71.
Blinov et al., Observation of entanglement between a single trapped atom and a single photon. Nature 2004, 428 (6979), 153-157.
Inlek et al., Multispecies Trapped-Ion Node for Quantum Networking. Phys. Rev. Lett. 2017, 118 (25).
Li et al., Quantum memory and gates using a $\Lambda$-type quantum emitter coupled to a chiral waveguide. Physical Review A 2018, 97 (6).
Shomroni et al., All-optical routing of single photons by a one-atom switch controlled by a single photon. Science 2014, 345, 903-906.
Tiecke et al., Efficient fiber-optical interface for nanophotonic devices. Optica 2015, 2 (2).
Bhaskar et al., Experimental demonstration of memory-enhanced quantum communication. Nature 2020, 580 (7801), 60-64.
Guha et al., Rate-loss analysis of an efficient quantum repeater architecture. Physical Review A 2015, 92 (2).
Krovi et al., Practical quantum repeaters with parametric down-conversion sources. Appl Phys B—Lasers O 2016, 122 (3).
Yang et al., Optical burst switching: a new area in optical networking research. IEEE Network 2004, 18 (3), 16-23.
Yoo, Optical Packet and Burst Switching Technologies for the Future Photonic Internet. Journal of Lightwave Technology 2006, 24 (12), 4468-4492.
Pirandola, Capacities of repeater-assisted quantum communications. Preprint arXiv 2016, 1601.
Pirandola et al., Fundamental limits of repeaterless quantum communications. Nat Commun 2017, 8 (1), 15043.
Pant et al., Rate-distance tradeoff and resource costs for all-optical quantum repeaters. Physical Review A 2017, 95 (1), 012304.
Pant et al., Routing entanglement in the quantum internet. npj Quantum Information 2019, 5 (1), 25.
Simon, Towards a global quantum network. Nature Photonics 2017, 11 (11), 678-680.
Wehner et al., Quantum internet: A vision for the road ahead. Science 2018, 362 (6412), eaam9288.
Kimble, The quantum internet. Nature 2008, 453, 1023-1030.
Lloyd et al., Infrastructure for the quantum Internet. ACM SIGCOMM Computer Communication Review Oct. 2004; 34 (4).
House, Office, N. Q. C., A Strategic Vision for America's Quantum Networks ,Feb. 2020.

(56) References Cited

OTHER PUBLICATIONS

Workshop, D. Q. I. B., From Long-distance Entanglement to Building a Nationwide Quantum Internet. 2020.
Luciano et al., In Multiplexing schemes for quantum repeater networks, Proc.SPIE, 2011.
Collins et al., Multiplexed Memory-Insensitive Quantum Repeaters. Phys. Rev. Lett. 2007, 98, 060502.
Sheikholeslami et al., In Covert communication over classical-quantum channels, 2016 IEEE International Symposium on Information Theory (ISIT), Jul. 10-15, 2016; 2016; pp. 2064-2068.
Bash et al., Quantum-secure covert communication on bosonic channels. Nature Communications 2015, 6, 8626.
Jing et al., Entanglement of three quantum memories via interference of three single photons. Nature Photonics 2019, 13 (3), 210-213.
Li et al., Experimental quantum repeater without quantum memory. Nature Photonics 2019, 13 (9), 644-648.
Zhao et al., Long-lived quantum memory. Nature Photon 2009, 5, 100.
Dudin et al., Light storage on the time scale of a minute. Physical Review A 2013, 87 (3).
Parniak et al., Wavevector multiplexed atomic quantum memory via spatially-resolved single-photon detection. Nat. Commun. 2017, 8 (2140).
Lan al., A Multiplexed Quantum Memory. Optics Express 2009, 17 (16), 13639-13645.
Li et al., Entanglement between light and an optical atomic excitation. Nature 2013, 498 (7455), 466-469.
Lim et al., Wavelength-multiplexed distribution of highly entangled photon-pairs over optical fiber. Opt Express 2008, 16 (26), 22099-104.

\* cited by examiner

METHOD AND SYSTEM FOR SHARING QUANTUM ENTANGLEMENT BETWEEN DISTANT NODES WITHOUT QUANTUM MEMORIES

CROSS-REFERENCE TO RELATED APPLICATIONS

The present patent application is related to and claims the priority benefit of U.S. Provisional Patent Application Ser. No. 63/216,452 filed Jun. 29, 2021, the contents of which are hereby incorporated by reference in its entirety into the present disclosure.

STATEMENT REGARDING GOVERNMENT FUNDING

None.

TECHNICAL FIELD

The present disclosure generally relates to the field of quantum optics, and in particular, to a system and method and system for use in quantum-based communication.

BACKGROUND

This section introduces aspects that may help facilitate a better understanding of the disclosure. Accordingly, these statements are to be read in this light and are not to be understood as admissions about what is or is not prior art.

Quantum mechanics is the study of particles whereby Newtonian laws of physics applicable to larger objects change drastically. Photons are such particles where quantum mechanics dictate a different relationship than Newtonian physics. For example, a phenomenon called photon entanglement occurs when two photons are paired in a superposition, whereby if the photons are separated their relationship with one another is maintained. For example, while prior to measurement, photons with certain entanglement properties do not have a defined polarization, if determined that one photon's electric field's oscillation direction (also known as polarization) is along the horizontal (vertical) direction the other is horizontal (vertical) as well. If direction of photon's electric field is ascertained, the direction of field of its twin would be immediately knowable to the observer.

Use of quantum mechanics has already provided such properties for encryption and other secure applications. This is because it would be essentially impossible to cause intrusion into a communication scheme that is dependent on such properties.

However, given the infancy of this field, effective physical layers for communication based on entanglement has not been developed. The need for a quantum optical communication network has been highlighted by recent demonstrations and blueprints by, for example, Chinese Satellite Communication effort, U.S. Department of Energy Blueprint on Quantum Internet, Europe's Quantum Internet Alliance, Canada's Quantum Encryption and Science Satellite, just to name a few. Efficient and deterministic distribution of quantum entanglement is key to developing future quantum networks. A network of this kind has applications in networked sensing for global parameter estimation, secure communication and distributed quantum computing.

To make the optical communication scheme fundamentally secure, photon entanglement between optical nodes is proposed. In general, an optical based communication system suffers from the degradation of the quantum optical information transmitted over long distances. The typical classical repeaters, however, add excessive noise to the already noise-sensitive quantum information making the traditional repeaters unusable. To remedy this limitation, quantum repeaters are needed.

Quantum repeaters have been proposed that rely on quantum memories or multiparticle entanglement to extend the communication distance beyond what is allowed by direct connection of optical fibers. The probabilistic nature of typical quantum photon sources based on spontaneous parametric down conversion or four-wave mixing in nonlinear materials makes it difficult to create synchronous entanglement between neighboring nodes. To synchronize multiple quantum sources that generate entangled pairs of photons at random times, quantum memories were proposed to store quantum information (entanglement) as created by sources while waiting for all nodes to receive entangled photons. The protocol can extend the quantum communication distance via the quantum repeater architecture where quantum memories act as a long-lived and low loss tunable delay line to synchronize quantum events. Quantum memories in such architectures must store optical information, coherently, for at least L/c, where L is the distance between the two nodes in a network and c is speed of light. Moreover, quantum memoires should also possess near unity quantum efficiency and add low to no noise to the optical signal carrying quantum information. High bandwidth (on the order of 10 s GHz) and telecommunication wavelength operation of quantum memories are other requirements for practical applications of quantum networks. To date, there is no quantum memory or deterministic source of entangled photons that even partially satisfy requirements of a quantum repeater and thus building a quantum-enabled secure network cannot be envisioned in the near future based on existing protocols. Therefore, while faithful encoding, transmission, and detection of quantum information carried by electromagnetic field promises fundamentally secure communication, long-distance quantum communication utilizing entanglement and memory-based repeaters have not been realized.

Therefore, there is an unmet need for a novel method, protocol, and system that can be used for practical and near-term quantum communication to address the lossy nature of optical systems and particularly low susceptibility to noise in quantum entangled systems while utilizing existing technology.

SUMMARY

An arrangement for a distributed quantum-based communication system using entangled photons is disclosed. The system includes a plurality of remote nodes (Nodes $A_i$ and Nodes $B_i$) each without a quantum memory. The system further includes a central entangling node (Node C) disposed between each of Nodes $A_i$ and Nodes $B_i$, wherein Nodes $A_i$ and $B_i$ are in both quantum communication and classical communication with Node C and in photon entanglement therebetween. The central node includes a controller. The central node further includes a first and second pair of broadband photon generators each adapted to generate photon pair sets at: i) random times within time-bins assigned by the controller, and ii) random frequency bins, wherein one photon of each entangled photon pair set is transmitted to an associated remote node (Node $A_i$) and another photon of the photon pair set is transmitted to another remote node (Node $B_j$) over the associated quantum channels. The central node further includes a multiplexed Bell-state analyzer configured to receive another photon of the pair sets of photons and adapted to perform Bell-state measurements between the received photons. If the received photons arrive at about same time having about same frequency, then the received photons are marked as being entangled and thus identified as belonging to an associated time-bin. The controller is configured to communicate the associated time-bins to the associated remote nodes (Node $A_i$ and Node $B_j$) over the associated classical channels, thereby entangling their associated photons. Each Node $A_i$ and the corresponding Node $B_j$ include a tunable delay configured to delay arriving photons at each of said Node $A_i$ and $B_j$ by at least a delay time $t_{mi}$ constituting difference in arrival time between photons over the quantum channel and data over the classical channel. A time-bin is a predetermined duration of time periodically repeated by the controller to synchronize photon generation and detection and each quantum channel dedicated to a frequency bin probabilistically contains a photon during each time-bin.

A method for distributed quantum-based communication system using entangled photons is also disclosed. The method includes providing a plurality of remote nodes (Nodes $A_i$ and Nodes $B_j$) each without a quantum memory, providing a central entangling node (Node C) disposed between each of Nodes $A_i$ and Nodes $B_j$, wherein Nodes $A_i$ and $B_j$ are in both quantum communication and classical communication with Node C and in photon entanglement therebetween, generating a plurality of broadband photon pairs by a broadband photon generator at: i) random times within time-bins assigned by the controller, and ii) random frequency bins; communicating one photon of each entangled photon pair set to an associated remote node (Node $A_i$) and another entangled photon pair set to another remote node (Node $B_j$) over the associated quantum channels, communicating another photon of the pair sets of photons to a multiplexed Bell-state analyzer disposed in Node C, and performing Bell-state measurements between the received photons. If the received photons arrive at about same time having about same frequency, then the received photons are marked as being entangled and thus identified as belonging to an associated time-bin. The method further includes communicating the associated time-bins to the associated remote nodes (Node $A_i$ and Node $B_j$) over the associated classical channels, thereby entangling their associated photon, and delaying photons in each Node $A_i$ and the corresponding Node $B_j$ each by a corresponding tunable delay by at least a delay time $t_{mi}$ constituting difference in arrival time between photons over the quantum channel and data over the classical channel. A time-bin is a predetermined duration of time periodically repeated by the controller to synchronize photon generation and detection and each quantum channel dedicated to a frequency bin probabilistically contains a photon during each time-bin.

DETAILED DESCRIPTION

Figure 1:
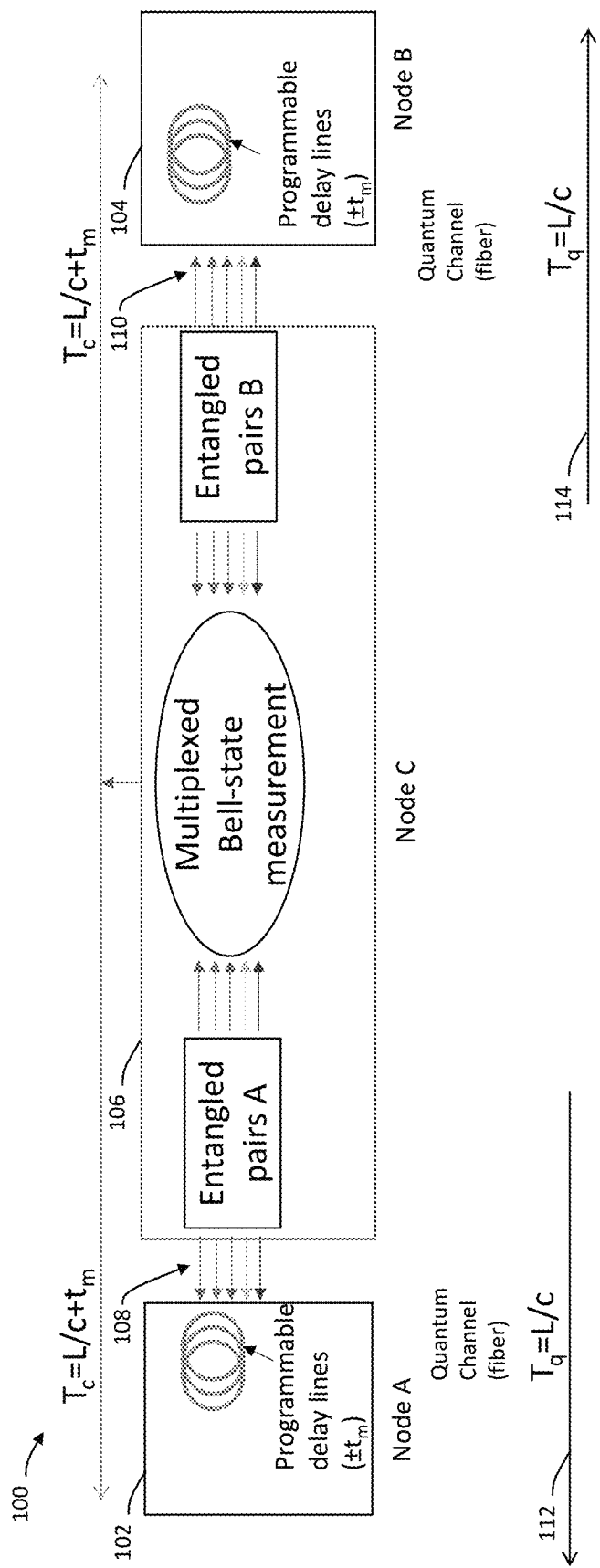
FIG. 1 is a schematic of a physical layer for quantum entanglement, according to the present disclosure is provided.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel method and system are disclosed that can be used for communication to address the lossy nature of optical systems and particularly low susceptibility to noise in quantum entangled systems. Towards this end, a practical approach to securely connect at least two nodes, Node A and Node B, sharing entangled photons over long distances is presented. The entanglement shared between the two nodes can be used to securely communicate secret massages, teleport quantum information or map entanglement to qubits within quantum processors to perform distributed quantum computing.

Referring to FIG. 1, a schematic of a physical layer 100 for quantum entanglement according to the present disclosure is provided. The physical layer of FIG. 1 includes three nodes: Node A 102, Node B 104, and Node C 106. Node A 102 wishes to communicate with Node B 104, however, due to the distance between Node A 102 and Node B 104 and random arrival time of entangled photons, an additional node (Node C 106), is needed to synchronize and share entangled photons. Moreover, the synchronization of entanglement at nodes A and B enables to extend the entanglement between Node A and Node B beyond nodes A and B, where a linear chain of Nodes A-Node C-Node B are considered to further extend the communication length. In the schematic of FIG. 1, two sets of channels are shown: 1) a classical channel between Node C and Node A identified as 108, and between Node C and Node B identified as 110; and 2) a quantum channel between Node C and Node A 112, and a quantum channel between Node C and Node B 114. The first of these two channel sets (i.e., the classical channel set) 108 and 110, includes synchronization signal and channel address. The classical information arrives to Node A 102 and Node B 104 after a time provided by Equation (1) below:

$$T_c = L/c + t_m \quad (1)$$

where L is the distance between Node C 106 and Node A 102 or between Node C 106 and Node B 104;

c is the speed of light; and $t_m$ represents a range of successful measurement time for local detection on half of entangled photons from two local sources within Node C 106 and feedforwarding the result of the measurement to a distant node (i.e., Node B 104) where the other half of entangled state is transmitted (in other words, $t_m$ is the electronic response time needed to generate a successful Bell state measurement signal once two photons with certain polarization arrive within the same time-bin to a Bell-analyzer channel), and which only requires delay of entanglement by as much as the measurement time. This is because both quantum and classical signals travelling on the associated channels require L/c time to arrive at the distant nodes.

Utilizing a programmable delay line, the amount of measurement time (as minimum as $t_m$) is applied to the quantum channel at Node A 102 and Node B 104. This programmable delay at each node ensures synchronization between the nodes, a function otherwise performed by quantum memories in the prior art which as discussed above are unavailable in current technologies. The small time delay requirement in the proposed topology enables using available programmable delay lines instead of quantum memories.

To date, out-of-lab demonstrations of quantum communication has been achieved by sending entangled photon to two and more parties with random arrival time. Therefore, such communication can only be used for quantum key distribution.

Not only the scheme devised here enables heralding entanglement at various locations of the network, it enables extending the communication distance or number of nodes via entanglement swapping, which is basically the measurement and feedforward process implemented within Node C.

The physical layer shown in FIG. 1, according to the present disclosure is composed of multiple devices and processes applied to a one-dimensional to two-dimensional network of quantum nodes, according to different embodiments. Node A 102 and Node B 104 are placed at the far ends of the link building block equipped at least with programmable delay lines and detectors to receive entangled photons. Repeating this three-node link building block and incorporation additional Bell-state analyzers in Node A and B enables extension of quantum communication beyond this three-node link. The classical channels are optical or RF connection (whichever is faster) communicating the result of measurement between the nodes and also share the clock signal and to synchronize processes at various places in the network. Additional control signal may be sent via the classical channels providing feedback to minimize classical noise such as polarization rotation. The signals carried in these channels are classical signals and can be amplified. The quantum channels considered here are low-loss optical fibers (dark fibers) used to transmit entangled photons generated from the source to the analyzer (detection stations) or delay lines in neighboring nodes. The length of the classical channel between neighboring nodes is similar to that of quantum channels.

Figure 2:
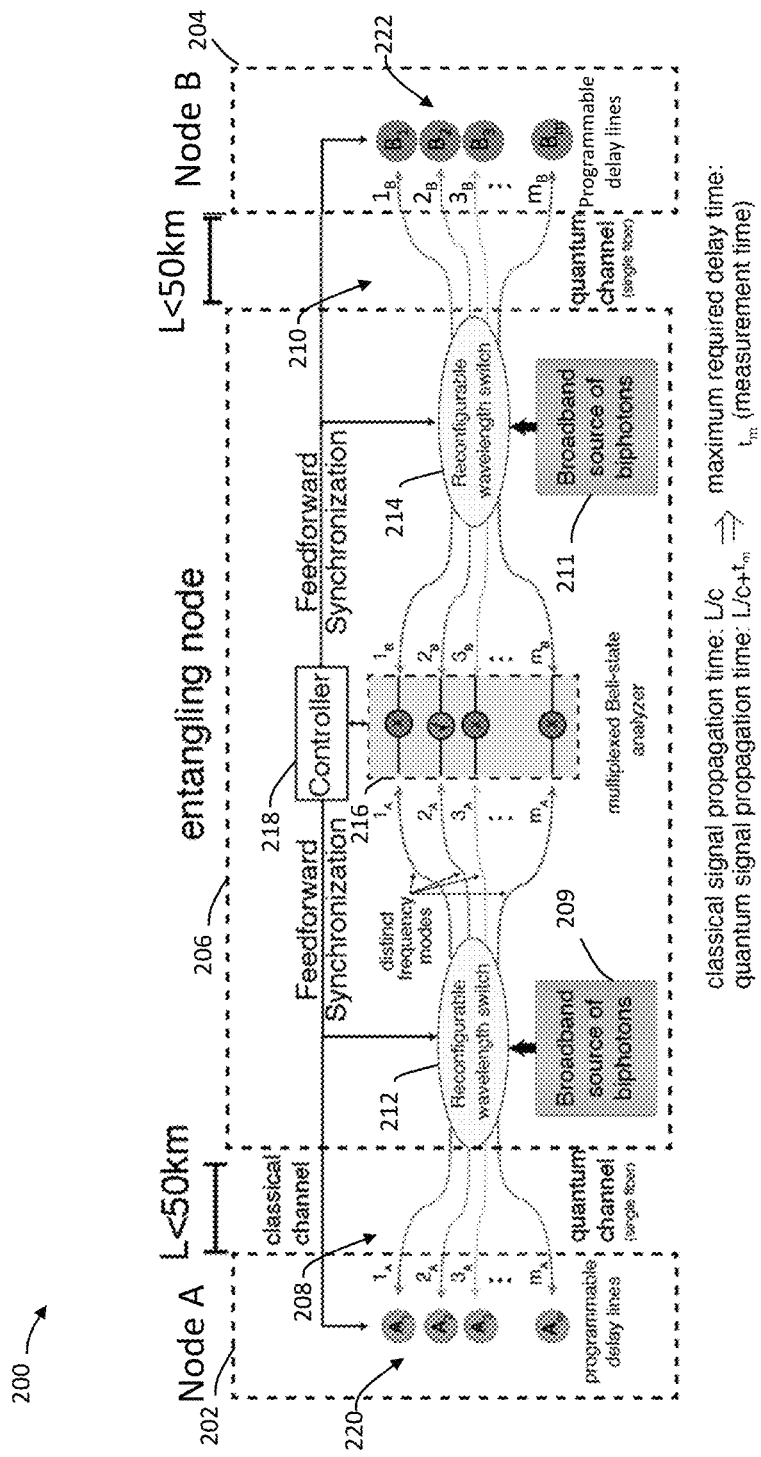
FIG. 2 is another schematic for a multi-node quantum entangled architecture, according to the present disclosure.

Referring to FIG. 2, another schematic is shown for a multi-node quantum entangled architecture 200, according to the present disclosure, providing more details about the architecture of the nodes (Node A 202, Node B 204, and Node C 206). The entanglement generated at Node C 206 as shown in FIG. 2 includes 1) probabilistic quantum optical sources 209 and 211 generating broadband photon pairs based on spontaneous parametric down conversion or four-wave mixing processes as shown by photons pairs of different wavelength referenced as 208 and 210, 2) reconfigurable (programmable) wavelength switches 212 and 214 (optional) which allows to carve out photons from the broad spectrum of the source and route to distinct spatial modes of certain frequency band (frequency bins of about 20 GHz wide) to perform joint measurement with corresponding modes of the other source, 3) a multiplexed Bell-state analyzer 216 which is an array of four single-photon detectors and polarization optics (in the case of polarization entangled photons) used to perform Bell-state measurements between photons of the same wavelength and bandwidth, and 4) a controller 218 which receives the measurement results from the Bell-state analyzer and communicates the results with neighboring nodes (e.g., Node A 202 and Node B 204) and which also provides feedback for noise cancelation and synchronizes all other processes in the network including source pumping time. Units $A_1$-$A_m$ 220 and $B_1$-$B_m$ 222 represent delay and measurement units assigned to each wavelength.

Multiple fiber loops with fast reconfigurable channels enable delay of the quantum photons by as much as the measurement time, $t_m$. Other commercial technologies can also be used as delay lines, given reasonable insertion loss and switching speed. As both classical and quantum signals travel a distance equivalent to L, the time delay between the two is primarily defined by measurement time ($t_m$) which is due to the electronic delay defined by the Bell-state analyzer 216, the speed of data acquisition cards (DAQ) and other input-output electronics, and duration of entangled photons. For example, in a photon pair source generating an entangled photon pairs with duration 1 μs with MHz input-output electronics or DAW speed, the dominant time scale is on the order of microsecond and thus maximum delay needed to synchronize photons is also on the order of microsecond. The rise time or the switch time of the delay line should be ideally similar to the inverse bandwidth of the photons. Additionally, the insertion loss of the delay lines should be as low as possible.

Figure 3:
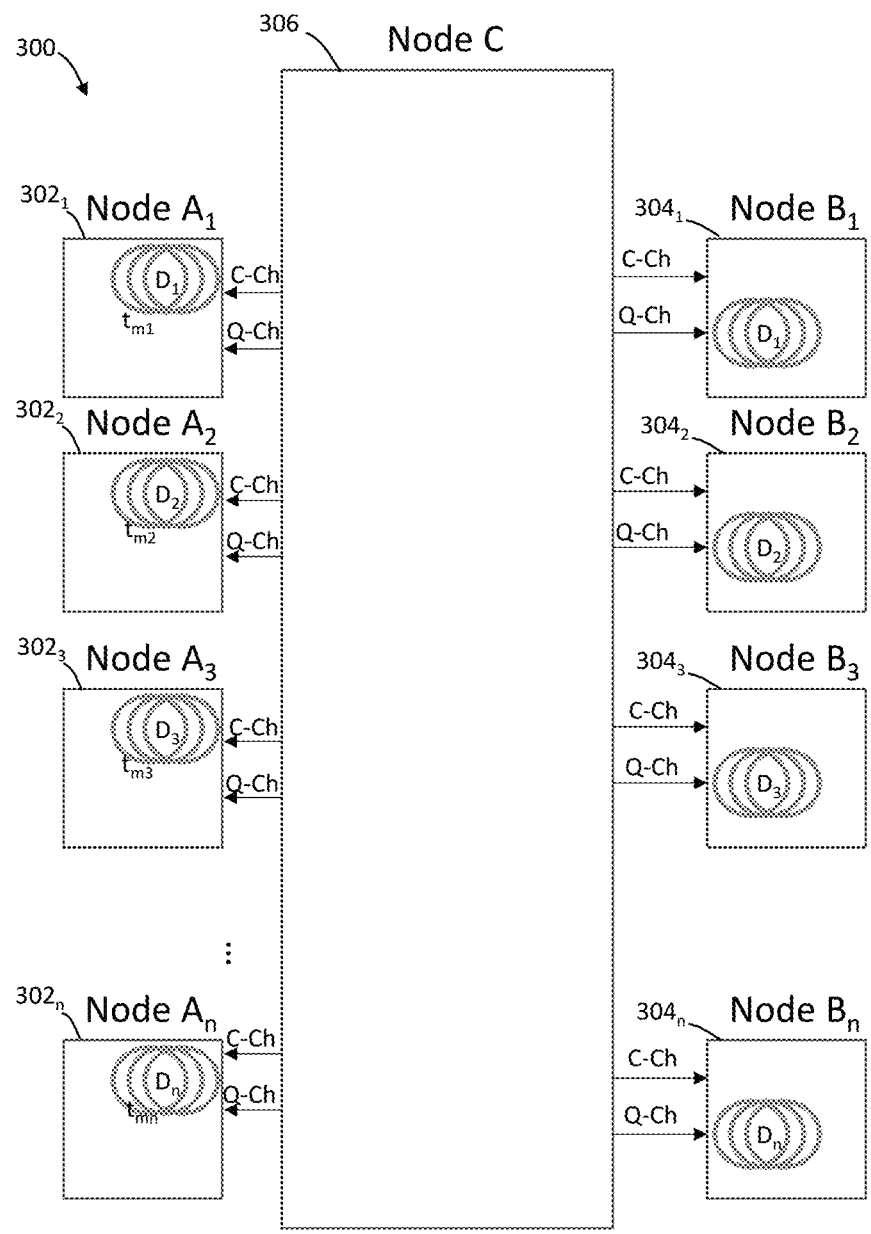
FIG. 3 is yet another embodiment of a physical layer, according to the present disclosure.

Referring to FIG. 3, another embodiment of a physical layer 300 according to the present disclosure is provided. The physical layer 300 shown in FIG. 3 includes a first plurality of remote nodes (Node $A_1$ $302_1$, Node $A_2$ $302_2$, Node $A_3$ $302_3$, . . . , Node $A_n$ $302_n$, or $B_i$ or $302_i$ for simplicity) and a second plurality of remote nodes (Node $B_1$ $304_1$, Node $B_2$ $304_2$, Node $B_3$ $304_3$, . . . , Node $B_n$ $304_n$, or $B_i$ or $304_i$ for simplicity). Each remote node (Node $A_i$ $302_i$ and Node $B_i$ $304_i$), is coupled to a central entangling node (Node C) 306. The entangling central node (Node C 306) and each of the entangled remote nodes (Node $A_i$ $302_i$ and Node $B_i$ $304_i$) are coupled to one-another including a classical communication channel (identified as C-Ch) as well as a quantum channel including low-loss optical fibers (dark fibers), as discussed above. Each combination of Node $A_i$ $302_i$ and Node C 306, and the associated combination of Node $B_i$ $304_i$ and Node C 306 include programmable delay lines $D_1$, $D_2$, $D_3$, . . . $D_n$ ($D_i$ for simplicity) located at Node $A_i$ $302_i$ and Node $B_i$ $304_i$, respectively. The delay lines $D_i$ serve the same purpose as previously discussed above. It should be appreciated that Node C 306 are as discussed above, e.g., with respect to FIG. 2, i.e., Node C 306 includes a pair of broadband sources of biphotons adapted to generate photon entanglement between Node $A_i$ $302_i$ and the associated Node C 306 and between Node C 306 and the associated Node $B_i$ $304_i$. According to this embodiment of the present disclosure, the central node (i.e., Node A 302) communicates with a plurality of remote nodes (e.g., Node $B_i$ $304_i$). For example, Node C 306 is centrally located within a locality, e.g., a zip code. It should be understood that the relative distance between each pair of the central node (Node C 306) and a remote node (Node $A_i$ $302_i$ and Node $B_i$ $304_i$), the entangling node (e.g., Node C 306) may be disposed closer or farther from one node (e.g., Node $A_i$ $302_i$) as compared to the other node (e.g., Node $B_i$ $304_i$).

While the embodiment shown in FIG. 3 provides entangling node (Node C 306) based on the description provided in FIG. 2, it should also be appreciated that the entangling node (Node C 306) can be configured to have a central controller rather than distributed controllers. In such a centrally disposed controller embodiment, the central controller is configured to communicate information to the remote nodes (Node $A_i$ 302$_i$ Node $B_i$ 304$_i$) via the classical communication channels. When multiple nodes are involved (i.e., a central node C 306 and Nodes $A_i$ 302$_i$ and Nodes $B_i$ 304$_i$) a successful Bell state measurement can differ from node to node. The $t_{mi}$ shown in FIG. 3 represents measurement time (or time slot) of corresponding nodes (i.e., $t_{m1}$ which corresponds to Node C 306, Node $B_1$ 304$_1$ and Node $A_1$ 302$_1$).

It should be appreciated that a single source of photons probabilistically generates entangled pairs of photons. However, with only one probabilistic source of photons, it is not possible to determine entanglement time and frequency shared between nodes $A_i$ 302$_i$ and $B_i$ 304$_i$. To address this limitation, two photon-pair sources in Node C 306 are utilized to determine the entanglement time and frequency by detecting two out of four photons when a successful measurement with corresponding frequency occurs.

Figure 4:
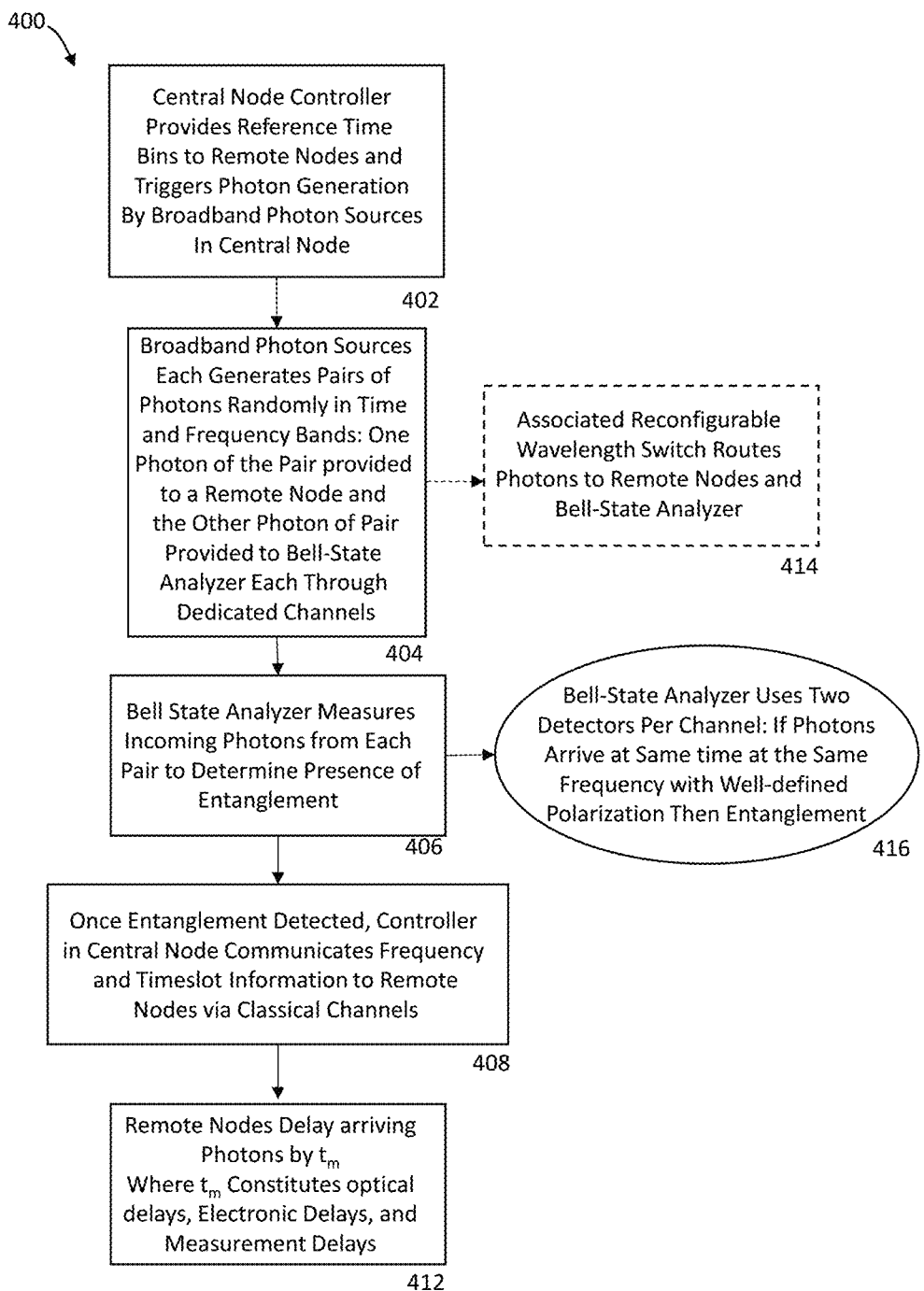
FIG. 4 is a block diagram of a method for distributed photon entangled quantum-based communication, according to the present disclosure.

To better elucidate the entanglement operation of nodes according to the present disclosure, reference is made to FIG. 4 which provides a method 400. The method 400 begins by establishing reference time-bins for remote nodes and communicating those bins to the remote nodes and further triggering photon generation by broadband photon sources in the central node, as provided in step 402. Next, broadband photon sources each generates pairs of photons randomly in time and frequency bands such that one photon of the pair is provided to a remote node and the other photon of pair is provided to bell-state analyzer each through dedicated channels, as provided in step 404. Optionally, these transferences are via reconfigurable wavelength switches which route photons on dedicated channels to remote nodes and the Bell-state analyzer, as provided in step 414. Next, the Bell-state analyzer measures incoming photons from each pair to determine presence of entanglement, as provided in step 406. This measurement is done by using two detectors per channel such that if photons arrive at the same time at the same frequency with well-defined matching polarization then entanglement is deemed to have occurred, as provided in step 416. Next, once entanglement is detected by the Bell-state analyzer, controller in the central node communicates frequency and timeslot information to remote nodes via classical communication channels, as provided in step 408. Next, and according to step 412, the remote nodes delay arriving photons (some of which have been identified by the controller at the central node as being entangled with a corresponding other remote node) each by a tunable delay line by at least a delay $t_{mi}$ associated with optical delays, electronic delays, and measurement delays within the central node. This delay represents difference in time of arrival of signals at the remote nodes between the quantum channel and the classical channel. In other words, the signals on the classical channel arrive $t_{mi}$ later to the remote nodes than the photons arrive over the quantum channels. In order to avoid loss of information, the arriving photon are delayed by more than $t_{mi}$ utilizing the aforementioned tunable delay lines. Considering a linear chain of Node-A-Node C-Node B links and adding Bell-state analyzer to nodes A and B, synchronization of entanglement at nodes Ai and nodes Bi enables to extend entanglement to node Ai and node nodes Bi of distant links.

Examples of above-mentioned hardware are provided below:

1) Tunable delay line at remote nodes: AGILTRON®: FIBER COIL VARIABLE TIME DELAY LINE and ULTRAFAST SYSTEMS: OPTICAL DELAY LINE;
2) Multiplexed Bell-state measurement device: IDQ: ID281 SUPERCONDUCTING NANOWIRE and IDQ: ID900 TIME CONTROLLER SERIES;
3) Broadband photon source: OZOPTICS: Polarization Entangled Photon Sources;
4) Quantum Channels: EITC: DARK FIBER NETWORKS;
5) Controller in Node C: NI: MULTIFUNCTION I/O and NI: DIGITAL I/O; and
6) Reconfigurable wavelength switch: IPG PHOTONICS®: FEMTOSHAPE-SR.

Those having ordinary skill in the art will recognize that numerous modifications can be made to the specific implementations described above. The implementations should not be limited to the particular limitations described. Other implementations may be possible.

The invention claimed is:

1. An arrangement for a distributed quantum-based communication system using entangled photons, comprising:
   a plurality of remote nodes (Nodes $A_i$ and Nodes $B_i$) each without a quantum memory;
   and
   a central entangling node (Node C) disposed between each of Nodes $A_i$ and Nodes $B_i$, wherein Nodes $A_i$ and $B_i$ are in both quantum communication and classical communication with Node C and in photon entanglement therebetween,
   the central node comprising:
      a controller;
      a first and second pair of broadband photon generators each adapted to generate photon pair sets at: i) random times within time-bins assigned by the controller, and ii) random frequency bins, wherein one photon of each entangled photon pair set is transmitted to an associated remote node (Node $A_i$) and another photon of the photon pair set is transmitted to another remote node (Node $B_i$) over the associated quantum channels; and
      a multiplexed Bell-state analyzer configured to receive another photon of the pair sets of photons and adapted to perform Bell-state measurements between the received photons, wherein if the received photons arrive at about same time having about same frequency, then the received photons are marked as being entangled and thus identified as belonging to an associated time-bin, wherein the controller is configured to communicated the associated time-bins to the associated remote nodes (Node $A_i$ and Node $B_i$) over the associated classical channels, thereby entangling their associated photons;
   wherein each Node $A_i$ and the corresponding Node $B_i$ include a tunable delay configured to delay arriving photons at each of said Node $A_i$ and $B_i$ by at least a delay time $t_{mi}$ constituting difference in arrival time between photons over the quantum channel and data over the classical channel, wherein a time-bin is a predetermined duration of time periodically repeated by the controller to synchronize photon generation and detection and each quantum channel dedicated to a frequency bin probabilistically contains a photon during each time-bin.

2. The distributed photon entangled quantum-based communication system of claim 1, wherein the quantum channel propagation time is L/c, where L is distance between Node $A_i$ and Node C or between Node C and Node $B_i$ and where c is the speed of light.

3. The distributed photon entangled quantum-based communication system of claim 1, wherein the classical channel propagation time is $L/c+t_{mi}$, where L is distance between Node $A_i$ and Node C or between Node C and Node $B_i$, c is the speed of light, and the $t_{mi}$ is associated optical delays, electronic delays, and measurement delays at Node C.

4. The distributed photon entangled quantum-based communication system of claim 1, wherein the broadband photon generators generate photons whose wavelengths mapped into different channels by a wavelength switch and time of arrival at corresponding nodes $A_i$ and $B_i$ are probabilistic.

5. The distributed photon entangled quantum-based communication system of claim 1, wherein the controller in Node C configured to determine the time-bin associated with the entangled photons and communicate the associated time-bin with Node $A_i$ and the associated Node $B_i$ after measurement time ($t_{mi}$).

6. The distributed photon entangled quantum-based communication system of claim 1, wherein the multiplexed Bell-state analyzer includes an array of single photon detector pairs configured to determine entanglement between Node $A_i$ and Node $B_i$.

7. The distributed photon entangled quantum-based communication system of claim 1, wherein Node C further includes a programmable wavelength switch associated with each broadband photon generate, and configured to select the number of quantum channels used for communication between Node C Node $A_i$ between Node C and Node Bi by passively directing photons generated within different frequency bins into different channels to control communication speed.

8. The distributed photon entangled quantum-based communication system of claim 1, wherein distance between Node C and the associated Node $A_i$ is less than 50 km.

9. The distributed photon entangled quantum-based communication system of claim 1, wherein distance between Node C and the associated Node $B_i$ is less than 50 km.

10. The distributed photon entangled quantum-based communication system of claim 9, wherein a linear chain of Node $A_i$-Node C-Node $B_i$ links are created and Bell-state analyzers are additionally incorporated in Nodes $B_i$ and Nodes $A_i$ to extend the communication beyond 50 km.

11. The distributed photon entangled quantum-based communication system of claim 1, wherein the quantum channel between Node C and Nodes $A_i$ and $B_i$ are comprised of dark fibers providing low-loss optical interfaces.

12. The distributed photon entangled quantum-based communication system of claim 7, wherein the frequency bins include about 20 GHz wide frequency windows separated by the wavelength switch about 1.5 μm center wavelength of the source.

13. A method for distributed quantum-based communication system using entangled photons, comprising:
providing a plurality of remote nodes (Nodes $A_i$ and Nodes $B_i$) each without a quantum memory;
providing a central entangling node (Node C) disposed between each of Nodes $A_i$ and Nodes $B_i$, wherein Nodes $A_i$ and $B_i$ are in both quantum communication and classical communication with Node C and in photon entanglement therebetween,
generating a plurality of broadband photon pairs by a broadband photon generator at: i) random times within time-bins assigned by the controller, and ii) random frequency bins; communicating one photon of each entangled photon pair set to an associated remote node (Node $A_i$) and another entangled photon pair set to another remote node (Node $B_i$) over the associated quantum channels;
communicating another photon of the pair sets of photons to a multiplexed Bell-state analyzer disposed in Node C;
performing Bell-state measurements between the received photons, wherein if the received photons arrive at about same time having about same frequency, then the received photons are marked as being entangled and thus identified as belonging to an associated time-bin,
communicating the associated time-bins to the associated remote nodes (Node $A_i$ and Node $B_i$) over the associated classical channels, thereby entangling their associated photon; and
delaying photons in each Node $A_i$ and the corresponding Node $B_i$ each by a corresponding tunable delay by at least a delay time $t_{mi}$ constituting difference in arrival time between photons over the quantum channel and data over the classical channel, wherein a time-bin is a predetermined duration of time periodically repeated by the controller to synchronize photon generation and detection and each quantum channel dedicated to a frequency bin probabilistically contains a photon during each time-bin.

14. The method of claim 13, wherein the quantum channel propagation time is L/c, where L is distance between Node $A_i$ and Node C or between Node C and Node $B_i$ and where c is the speed of light.

15. The method of claim 13, wherein the classical channel propagation time is $L/c+t_{mi}$, where L is distance between Node $A_i$ and Node C or between Node C and Node $B_i$, c is the speed of light, and the $t_{mi}$ is associated optical delays, electronic delays, and measurement delays at Node C.

16. The method of claim 13, wherein the broadband photon generators generate photons whose wavelengths mapped into different channels by a wavelength switch and time of arrival at corresponding nodes $A_i$ and $B_i$ are probabilistic.

17. The method of claim 13, wherein the controller in Node C configured to determine the time-bin associated with the entangled photons and communicate the associated time-bin with Node $A_i$ and the associated Node $B_i$ after measurement time ($t_{mi}$).

18. The method of claim 13, wherein the multiplexed Bell-state analyzer includes an array of single photon detector pairs configured to determine entanglement between Node $A_i$ and Node $B_i$.

19. The method of claim 13, wherein Node C further includes a programmable wavelength switch associated with each broadband photon generate, and configured to select the number of quantum channels used for communication between Node C Node $A_i$ between Node C and Node Bi by passively directing photons generated within different frequency bins into different channels to control communication speed.

20. The method of claim 13, wherein distance between Node C and the associated Node $A_i$ is less than 50 km.

21. The method of claim 13, wherein distance between Node C and the associated Node $B_i$ is less than 50 km.

22. The method of claim 21, wherein a linear chain of Node $A_i$-Node C-Node $B_i$, links are created and Bell-state analyzers are additionally incorporated in Nodes $B_i$ and Nodes $A_i$ to extend the communication beyond 50 km.

23. The method of claim 13, wherein the quantum channel between Node C and Nodes $A_i$ and $B_i$ are comprised of dark fibers providing low-loss optical interfaces.

24. The method of claim 19, wherein the frequency bins include about 20 GHz wide frequency windows separated by the wavelength switch about 1.5 μm center wavelength of the source.

* * * * *